April 7, 1942.  W. D. CHILTON  2,278,689
LOCK WASHER TO BOLT ASSEMBLY MACHINE
Filed May 1, 1939  3 Sheets-Sheet 1

Inventor
William D. Chilton
By Blackmore, Spencer & Flint
Attorneys

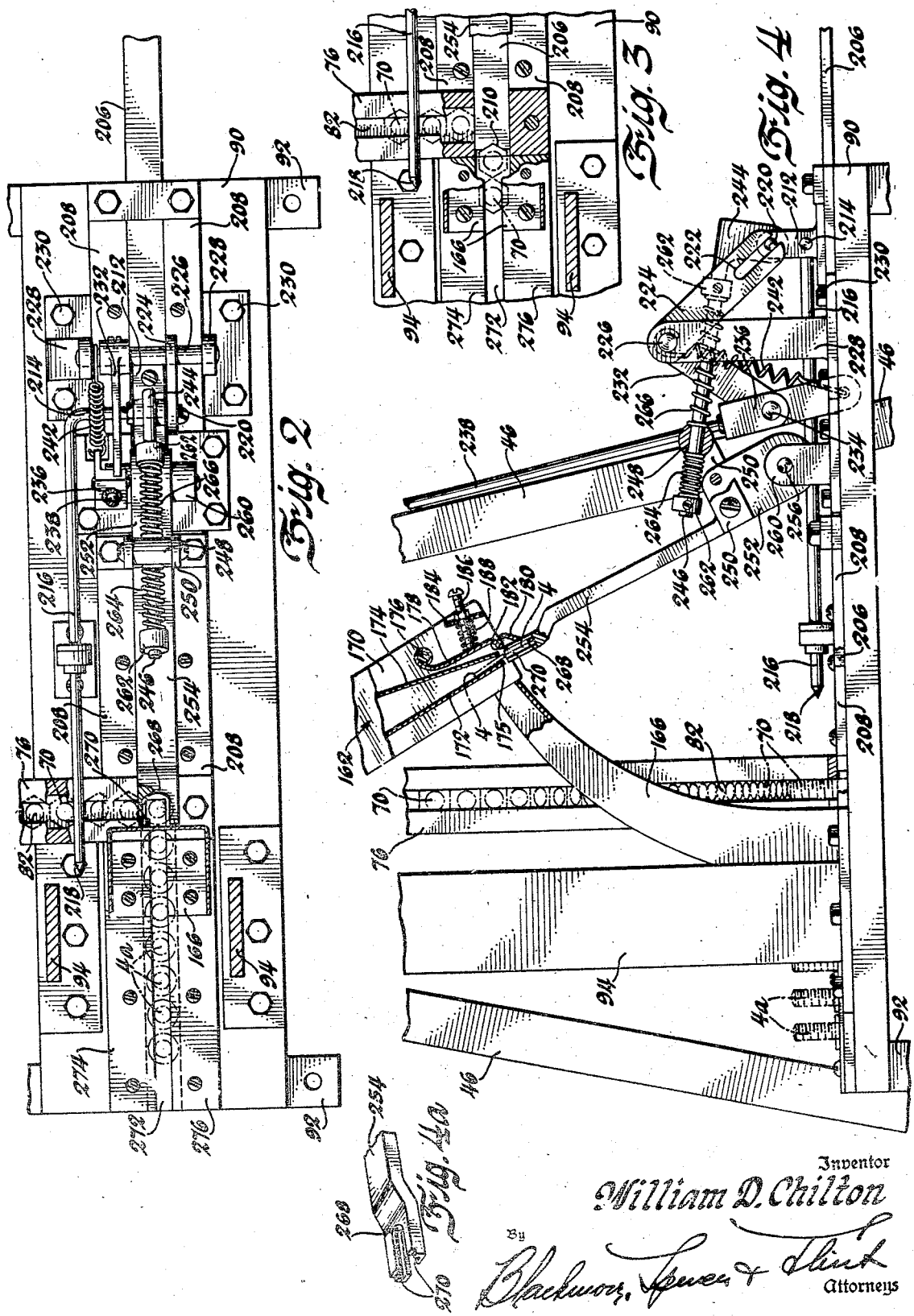

April 7, 1942.   W. D. CHILTON   2,278,689
LOCK WASHER TO BOLT ASSEMBLY MACHINE
Filed May 1, 1939   3 Sheets-Sheet 3
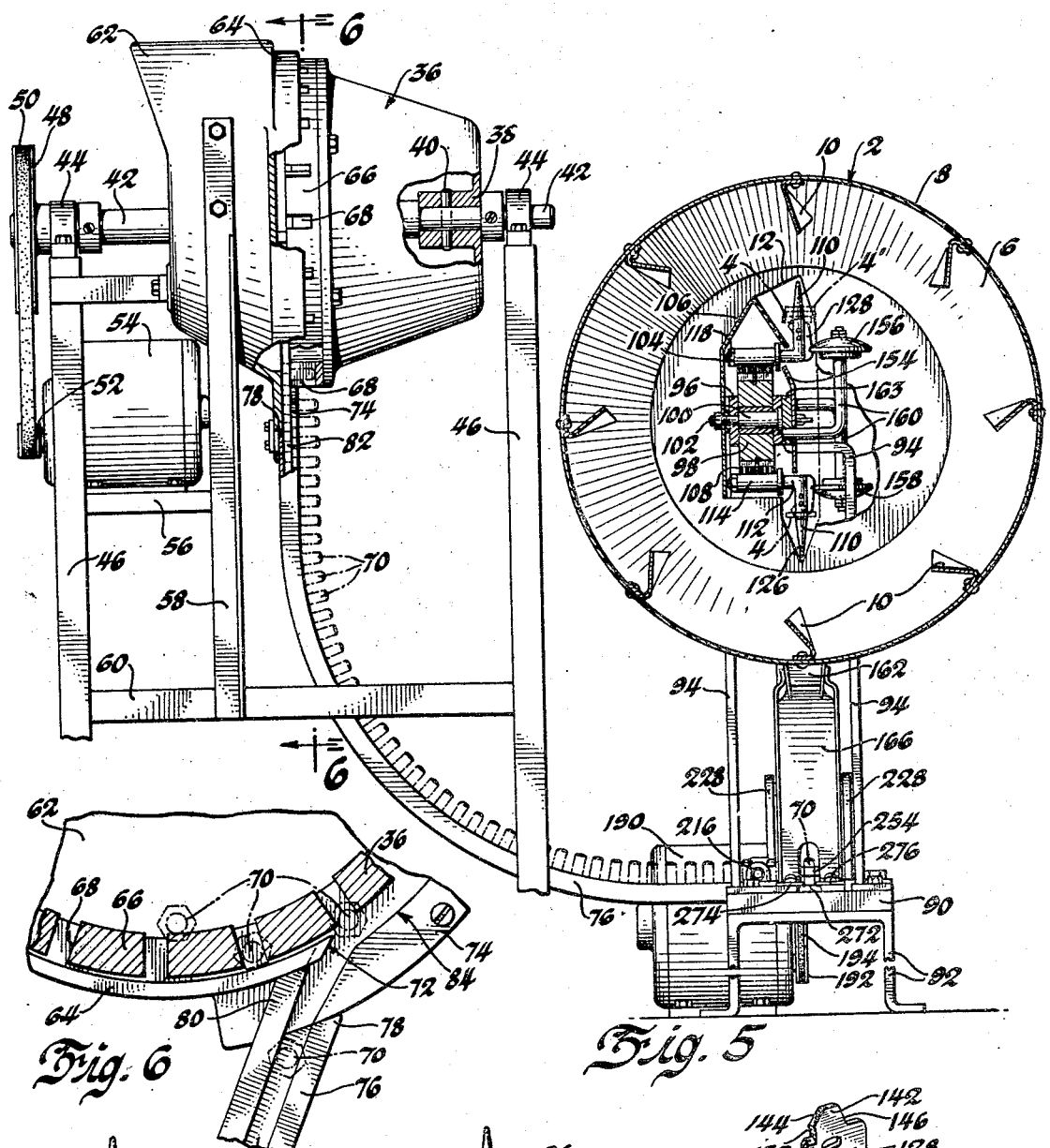
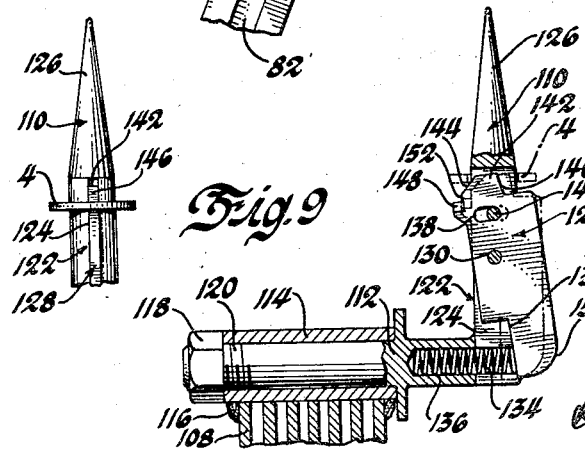

Patented Apr. 7, 1942

2,278,689

UNITED STATES PATENT OFFICE 2,278,689

LOCK WASHER TO BOLT ASSEMBLY MACHINE

William D. Chilton, Detroit, Mich., assignor to General Motors Corporation, Detroit, Mich., a corporation of Delaware Application May 1, 1939, Serial No. 271,119

6 Claims. (Cl. 29—84)

This invention relates to a machine for placing lock washers over or on bolts.

In the past it has generally been the practice to place a lock washer over a bolt by hand and this has consumed a great deal of time and necessitated considerable labor expense where a large number of bolts were used. The time and labor problems were not particularly difficult where the number of bolts used was small, but in the manufacture of automobiles where a large number of the same size of bolt is used it was found to be rather expensive to perform the work by hand and to necessitate considerable hand labor to place the lock washers on the bolts.

It is the object of the present invention to design and to construct a machine which will eliminate the hand labor and which will place the lock washers on the bolts at a very rapid rate.

The particular novelty of the invention resides in the interrelation of a bolt selector, a lock washer selector, and a device for picking up the lock washers and depositing them on the bolts.

The bolt selector comprises a rotary drum in which the bolts are placed at random. The drum has slots at the bottom to receive the bolts and as the drum rotates the slots pick up the bolts and the drum deposits them in a race or trough and this race or trough leads the bolts to the mechanism for depositing the lock washers on the bolts.

The lock washer selector likewise comprises a rotary drum with a plurality of shelves on its inner periphery. The lock washers are placed indiscriminately in the drum and the rotation of this drum will cause the shelves to pick up the lock washers and spill them over a plurality of fingers or points mounted on an endless chain or belt. These fingers or points have a mechanism which is adapted to retain but one of the lock washers although more may be spilled on a point or finger, and at a given place in the operation of the belt, the fingers are caused to deposit the retained lock washer in a special hopper.

The mechanism for depositing the washer on the bolt picks one lock washer at a time from the hopper and places it on the bolt. After placing the washers on the bolts the mechanism operates to push the bolt and its lock washer away from the machine to allow placing of a new bolt to receive a washer. An arm is operated in timed relation with the mechanism for placing the washer on the bolt and this arm shifts the endless belt to furnish a continuous supply of washers.

On the drawings

Figure 2 is a plan view of a part of the washer placing mechanism taken on the line 2—2 of Figure 1.

Figure 3 is an enlarged detailed view, with parts shown in section, showing the operating bar displacing one of the bolts after it has received its lock washer.

Figure 4 is an enlarged sectional detailed view showing the washer selecting arm receiving a new washer.

Figure 4a is a perspective view of one end of the washer selecting arm.

Figure 5 is a view on the line 5—5 of Figure 1, parts being broken away and shown in section better to illustrate the construction.

Figure 6 is an enlarged sectional detailed view on the line 6—6 of Figure 5.

Figure 7 is a sectional detailed view of one of the selector fingers or points.

Figure 8 is a perspective view of the lever associated with one of the selector fingers.

Figure 9 is a view of the upper part of Figure 7, looking from the right.

Figure 1:
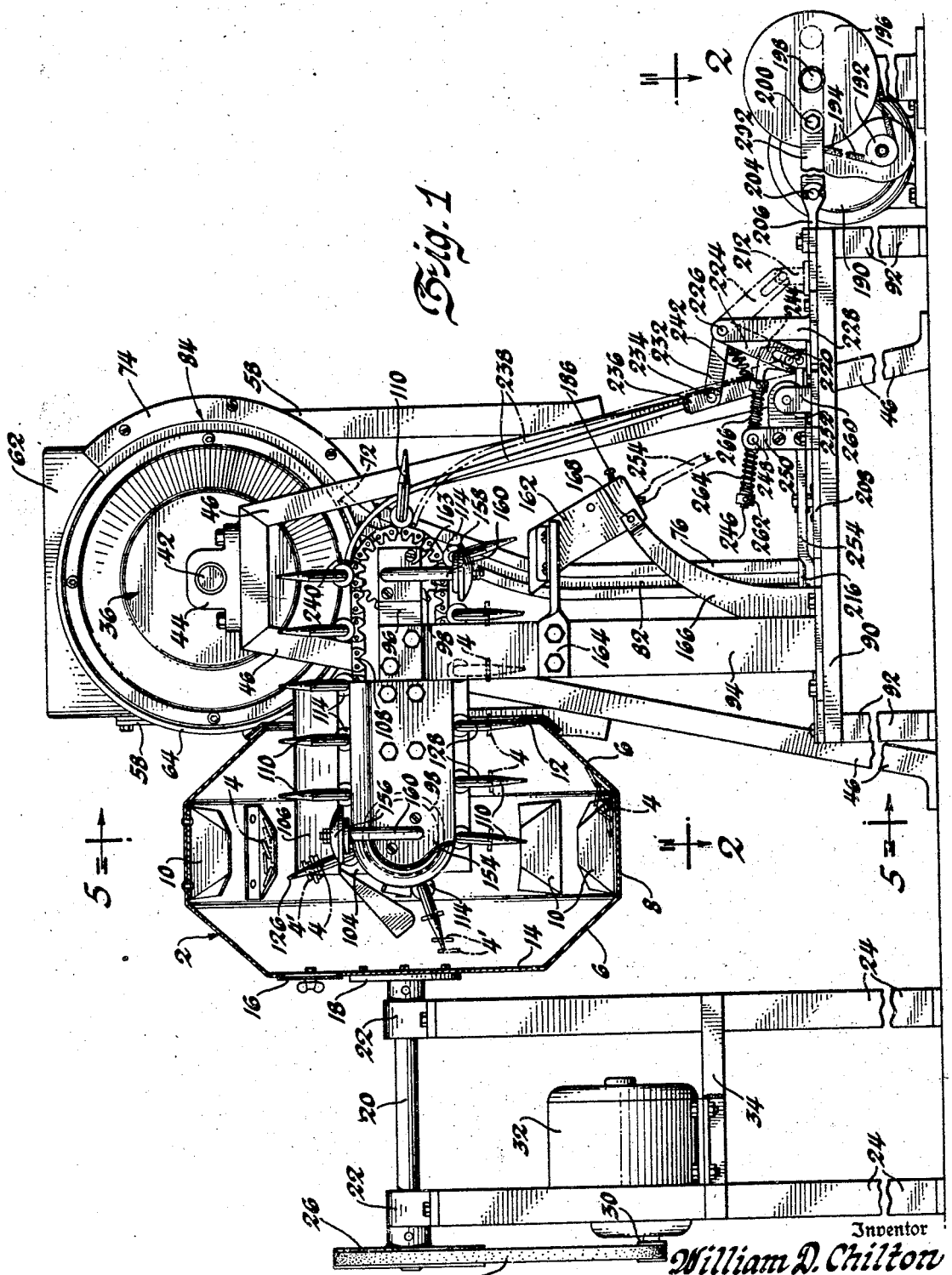
Figure 1 is an end view of the machine with the drum containing the lock washers shown in section, and a second position of the parts being shown in dotted outline.

Referring to the drawings, the numeral 2 indicates as a whole a metal drum in which are placed the lock washers indicated in dotted outline at 4. This drum has the tapered sides 6 and the flat central ring part 8, and to the ring part at the inner periphery there are secured the fins or shelves 10 which pick up the lock washers as the drum rotates, and when the fins 10 reach their uppermost position the lock washers are spilled for a purpose which will be later described. The drum 2 has the opening 12 in one end and the closed end 14, the end 14 having the removable door 16 to enable the lock washers to be supplied to the drum.

The drum 2 is secured at its closed end to an enlarged flange 18 secured on the end of the shaft 20 mounted in bearings 22 at the top of two upright frame members 24. The shaft 20 has the grooved pulley 26 at its other end and a V-belt 28 is trained over the pulley 26 and over the sheave 30 of an electric motor 32 mounted on transverse supports 34 secured to the frame uprights 24. When the motor 32 is in operation, it will, of course, drive the pulley 30, and through the belt 28 and pulley 26 the shaft 20 will be driven. The rotation of the shaft will rotate the drum 2.

Referring to Figures 1, 5, and 6, a second rotary drum 36 is rigidly secured by means of the hub 38 and pin 40 to a shaft 42 mounted in bearings 44 positioned at the top of the frame members 46. The shaft has a grooved pulley 48 with a V-belt 50 trained thereover, the belt 50 being driven from the sheave 52 on the shaft of an electric motor 54 mounted on transverse supports 55 secured to one upright 46 of the frame and upright intermediate members 58 of the frame. The members 58 are secured to a transverse frame member 60 secured to the two uprights 46.

A stationary hopper 62 is positioned closely adjacent the drum 36 and an annular flange 64 on the hopper overlaps the end of the drum 36. The hopper is supported by means of the uprights 58, the shaft 42 passing through the hopper. The hopper 62 is for the purpose of receiving bolts.

The annular end 66 on the drum 36 extends into the flange 64 on the hopper 62 and this annular end 66 is provided with a plurality of recesses or openings 68 which are of a size to receive the bolts indicated in dotted outline at 70. As the drum 36 rotates, one or more of the openings 68 will pick up a bolt and hold it in the recess 68. The flange 64 on the hopper will prevent the bolts from falling through the openings 68 and as the hopper continues to rotate, the bolts will reach the place indicated at 72 in Figure 6 at which point the annular flange 64 is cut away to allow the bolts to drop. An outside closure element 74 is provided and the extent of this closure member corresponds to the extent of the cut out part of the flange 64. After the bolts have been dropped beyond the point at 74 they will fall downward and the bolt heads will be received in the race or track 76 to be passed to the lock washer applying mechanism. The track 76 begins at 78 but has one side extending therebeyond as indicated at 80, this side extending up to the flange 64. The race or track 76 is wide enough at its bottom conveniently to receive the heads of the bolts 70 while the slot 82 therein is of a size conveniently to allow the passage of the shanks of the bolts 70. The continued rotation of the drum 36 picks up the bolts and drops them beyond the point 72 into the race or groove 76 and in case the groove is filled as is indicated in Figure 5, the bolts will ride upward in the arcuate slot at 84 and be redeposited in the opening.

The washer selecting mechanism is best shown in Figures 1 and 5 with a detail of one of the fingers shown in Figures 7 and 8. A table 90 is mounted on legs 92 and on the table 90 upright supports 94 are mounted. At the upper ends of these supports there are mounted the transverse base members 96 between the ends of which the sprocket gears 98 are rotatably mounted on shafts 100, the shafts having plain bearings as is shown in Figure 5. The shafts are secured in place by means of the nuts 102 screwed on the threaded shaft ends, these nuts 102 at the same time holding in place a shield 104 having a V-shaped upper end 106. Over the sprocket gears 98 there is trained the endless chain or belt 108 and secured to the belt at a plurality of spaced points are the fingers 110.

A detail of one of these fingers is best shown in Figure 7. The finger comprises the base 112 mounted in the cylinder 114 welded as at 116 to the chain 108. A nut 118 secured onto the threaded end 120 of the base rigidly but removably holds the fingers in the mounting cylinder 114. The finger has the right angular extension 122 which is slotted at 124 and has the pointed or conical extremity 126. In the slot 124 there is received a lever 128 pivoted at 130. The lower end of the lever is cut away as at 132 and is pressed away from the base 112 by means of a coil spring 134 received in a recess 136 formed in the base. The lever 128 has an arcuate slot 138 therein and a pin 140 passing through the finger enters the slot 138 and limits the movement of the lever.

The shape of the upper end of the lever is best shown in Figure 8. The tip 142 of the lever has the inclined side 144 on one side and the cut away part 146 at the opposite side. Immediately below the inclined side 144 and in line with the lower part of the cut away part 146 a knife-edged shoulder 148 is provided.

Referring to Figure 7, it will be seen that as the spring 134 presses the lower end of the lever to the right, the upper end or tip of the lever will be forced to the left. With the lever in the full line position shown in Figure 7, the lock washer cannot fall over the inclined edge 144 onto the shoulder 148, because the opening in the washer is not large enough to be received over the end of the lever, but if the end of the lever at the rounded part 150 is pressed to the left (Figure 7) the lever will assume the dotted line position which will throw the tip 142 to the right or into the slot 124 and in this position the washer 4 is able to fall onto the knife-edged shoulder 148, and when the lever is released the spring will force the end at 150 to the right, and the upper end 142 and the shoulder 148 to the left. This will cause the surface at 152 on the tip of the lever to grip the washer 4 and hold it on the upright part 122 of the finger.

Referring again to Figures 1 and 5, it will be seen that one end of the washer selector mechanism extends through the opening 12 in the end of the drum 2 and is positioned centrally of the drum so that as the drum rotates and the shelves or fins 10 take an inverted position, the washers will be dropped over the points 126 of the fingers 110 and each finger will receive one or more washers, but as the retaining shoulder or surface at 152 of the point of the lever 128 is able to hold but one washer, the remaining washers, as indicated at 4' in Figure 1, will be allowed to fall into the drum.

Referring to Figure 5, in addition to the shield 106, a second shield 154 is provided to prevent the excess washers from falling into the parts of the mechanism. The shields 106 and 154 cover or protect the sprocket wheel 98 in the drum 2.

The normal position of the finger 110 and lever 128 is as shown in full lines in Figure 7, but as the fingers approach the place where the lock washers are to be spilled thereon, the end 150 of the lever 128 contacts the stationary roller 156 which presses the end 150 of the lever inwardly in order that the tip 142 may be in the dotted line position of Figure 7 to receive a washer. After the finger passes the roller 156, the spring 134 will force the end 150 outwardly to cause the tip 142 to grip one only of the washers.

At the end of the washer selecting mechanism outside the drum 2 a second stationary roller 158 is mounted. Both of these rollers 156 and 158 are mounted on L-shaped arms 160 secured in plates 163 secured to the base plate 96. The roller 156 is at the top of the washer selecting mechanism and the roller 158 is at the bottom thereof and as the belt 108 rotates, the finger 110 will eventually pass the roller 158 which will depress the end 150 of the lever 128, and as the fingers are now in the inverted position the inward pressure on the lever end 150 will cause the washer on the finger to be released and fall into a receptacle or hopper 162, mounted on an arm 164, secured to the upright 94 of the machine.

An arcuate arm 166 has its lower end mounted on the table 90 and its upper end secured to the lower end of the hopper as at 168. The arms 164 and 166 hold the hopper 162 in position.

The details of the hopper are best shown in Figure 4. The hopper has the two opposite stationary sides 170 positioned in parallel planes and a third stationary side 172 in a plane at right angles to the sides 170. The fourth side 174 is inclined with reference to the side 172 and the lower ends of these two sides form a narrow mouth 175. A pin 176 secured in the sides 170 pivotally mounts a lever 178, the end 180 of which extends beyond the mouth at the bottom of the hopper, and there is formed on the lever, immediately below the end of the inclined side 174, a projection 182 which extends under the mouth 175. A plate 184 is secured to the sides 170 and in the plate a screw 186 is applied, and the end of this screw limits the extent of movement of the lever 178. A coil spring 188 surrounding the end of the screw 186 always urges the lever 178 to the left (Figure 4) and retains the projection 182 over the mouth 175. When the washers are dropped into the hopper 162 they will therefore slide downward between the sides 172 and 174 as far as permitted by the projection 182, and the manner in which the washers are taken from the hopper will now be described.

Referring to Figures 1, 2, 3, and 4, the mechanism for taking the washers from the hopper and placing them on the bolts and shifting the bolt with its applied washer away from the mechanism is shown. An electric motor 190 has a pulley 192 driving a belt 194 which in turn drives a wheel 196 mounted to turn on a shaft 198. This wheel has an eccentric pin 200 to which there is attached a crank arm 202 and the end of the crank arm is coupled by means of the pin 204 to a reciprocable bar 206. This bar 206 slides between the ways or tracks 208 mounted on the table 90. The extreme end of the bar 206 is shown in Figure 3 to have a V notch 210 in which there may be received one of the angles of the hexagonal head of one of the bolts 78.

An upstanding bracket 212 is secured to the bar 206 and moves therewith. At the base of the bracket there is secured the angled end 214 of a rod 216, the end 218 of which is pointed as is best shown in Figures 2, 3, and 4. The purpose of this pointed end is to enable the rod to pass between successive bolts 78 on the track or race 76 which leads the bolts to the mechanism shown in Figures 2, 3, and 4. The interposition of the end of the rod 216 between the successive bolts will prevent the bolts from crowding toward the station at which the washers are applied and will enable one of the bolts to be accurately positioned to receive its washer.

The upper end of the bracket 212 is forked and has a shaft 220 passing through the forks. This shaft extends beyond one side of the bracket 212 and a slot 222 of a lever 224 is received over the extending end 220 so that as the bracket 212 is moved the interengagement of the shaft 220 and slot 222 will force the lever 224 to move and to rotate its shaft 226 mounted at the ends of the uprights 228 secured as by the bolts 230 to the table 90. The shaft 226 also has rigid therewith a second lever 232, the levers 224 and 232 together with the shaft 226 forming a bell crank lever. The end of the lever 232 is pivoted as at 234 to an enlarged end 236 of a pusher rod 238 extending upwardly (see Figure 1) and having its end 240 turned at an angle and adapted to engage with the sides of the mounting cylinders 114 in which the fingers 110 are mounted. The enlarged end 236 extends downwardly beyond the pivot 234 and a coil spring 242 has one end secured to the end of the enlarged end 236 and its other end hooked on the shaft 226. This spring will constantly hold the bent end 240 against the mounting cylinder 114 of the washer selector mechanism.

Between the tines of the bracket 212 there is pivoted on the shaft 220 the right angularly bent head 244 of a slider rod 246. This rod extends to the left of its pivotal axis 220 in Figure 4 and passes through a turnable bar 248 mounted in side plates 250 secured to the head 252 formed on an arm 254 pivoted at 256 between brackets 260 mounted on the table 90. Between the heads 262 secured at each end of the slider rod 246 and the turnable bar 248, there are mounted the coil springs 264 and 266, these coil springs being under compression.

Referring to Figures 2 and 4a, it will be seen that the end of the arm 254 is recessed as indicated at 268 and the side edges of the recess are grooved as indicated at 270. The cross section of the recess 268 is therefore of U-shape and is adapted to receive and hold one of the washers 4 from the hopper 162.

The operation of the bolt selector and washer selector has been described in the foregoing, and from the description of these two devices it will be apparent that the bolts are delivered from the end of the race 76 to the mechanism of Figure 4 and the washers are delivered to the hopper 162. By referring to Figures 4 and 5 it will be seen that the race 76 extends downwardly from the hopper 36 and is curved over to the table 90 to deliver the bolts 78 to the table 90 in a horizontal position at a definite washer receiving station. In Figures 1 and 4 the two extreme positions of the washer placing mechanism are shown in full lines. In Figure 1 the washer selecting arm 254 is in its downwardmost position or in the position in which it applies a washer 4 on a bolt 78. With the crank arm 202 in alignment with the bar 206, the end of the bar 206 is in the position shown in Figure 3 and has pushed one of the bolts with its washer away from the station where the arm 254 deposits the washer on the bolt. The continued movement of the crank arm 202 will now pull the bar 206 to the right (Figure 1) and cause the arm 254 to be raised forwardly. This upward movement of the arm will be brought about by the movement of the bracket 212 which will pull therewith the head 244 and the slidable rod 246. The rod 246 passing through the rotatable bar 248 will cause the arm 254 to swing upwardly until the recessed end 268 strikes against the finger or end 180 on the lever 178. The lever 178 is limited in its movement by the screw 186 and after the projecting part 182 has been moved from the bottom of the sides 174 and 172, the washer in the hopper will be allowed to drop into the groove 270 in the end of the arm 254. In case the bar 206 should move a distance beyond that which is necessary to swing the end of the arm in alignment with the bottom of the hopper, no damage will be done to the mechanism for the reason that although the arm 254 is held by the end 180 of the lever 178, the coil spring 264 will be compressed to allow the movement of the slider rod 246 in its bearing in the turnable bar 248. When the bar 206 reciprocates to the left from its extreme position in Figure 4, the reverse movement of the parts will take place, that is, the bracket 212 will now move to the left and carry therewith the slider rod 246. As soon as the compression of the spring 264 has been relieved so that it equalizes the pressure exerted by the spring 266, the arm 254 will move downwardly and the arcuate surface of the brace 166 will prevent the washer from being thrown out of the groove in the recessed end 268 of the arm 254. When the arm 254 reaches the downwardmost end of its movement, the end of one of the bolts will be in position immediately under the end of the arm 254 and the arm will then position the washer on the bolt. Simultaneously, the retainer rod 216 will have been slipped between adjacent bolts (Figures 2 and 3). The bar 206 will continue its movement for a distance at least equal to or slightly greater than the width of the head of one of the bolts after the arm 254 has reached its lowermost position as shown in Figure 1. This continued movement will now compress the spring 266 and push the bolt and its positioned washer into the groove 272 formed by the flat plate-like members 274 and 276. In Figures 2 and 4 the numeral 4a designates the bolts which have the lock washers placed thereon.

Simultaneously with the movement of the bar 206 to the left (Figure 4) the bracket 212 will swing the lever 224 which will turn the shaft 226 and in turn move the lever 232 to swing the rod 238 upwardly. This upward movement of the rod will cause it to move from the dotted line position in Figure 1 to the full line position, and in this movement it will cause the rod end 240 to move the chain 108 and its finger a distance equal to the space between the two adjacent fingers and this movement will cause one finger to pass the roller 158 to cause the finger to release its washer and drop it into the hopper 162.

I claim:

1. In a machine for assembling lock washers on bolts, a table, a bar reciprocably mounted on the table, a rod slidably mounted on the table and secured to the bar and reciprocable therewith, an arm pivoted to the table adjacent the bar, a connection between the bar and arm to cause the arm to be moved simultaneously with the reciprocation of the bar, said arm having its end shaped to receive and hold a washer, means, at one location of said arm, to feed washers, one at a time, to said end, said arm adapted to swing from said location to a bolt located on said table for depositing the washer on a bolt, means for feeding bolts to said last named location, said rod being movable between the bolts and restraining the bolts from crowding toward the washer receiving location while the arm is depositing a washer on a bolt, said bar being in alignment with an assembled bolt and washer, the connection between said arm and said bar being yieldable to cause a certain amount of lost motion to enable the bar to be further reciprocated after said arm has deposited a washer thereby to push the bolt and its washer away from the washer receiving location to allow the presenting of a new bolt to receive a washer. and means for reciprocating said bar.

2. In a machine for assembling a lock washer to a bolt, means to feed bolts to a definite station, a reciprocable bar, an oscillatable arm pivotally mounted adjacent the bar, means interconnecting the bar and arm to cause the arm to move with the bar to and from the station, a hopper, said arm moving in one direction to the hopper and adapted to take a washer therefrom, the movement of the arm in the other direction depositing the washer over the bolt at the station, and said bar adapted to move the bolt and washer away from the station after the washer has been placed thereon.

3. In a machine for assembling a lock washer to a bolt, means to feed bolts to a definite station, a hopper for supplying washers, a table, a reciprocable bar mounted to slide in the table, a movable arm pivoted to the table adjacent the bar, a rod pivotally mounted on and adapted to be moved by the bar, means connecting the rod to the arm to cause the arm to be moved by the rod, the movement of said bar in one direction causing the arm to swing on its pivot toward the hopper to take a washer therefrom, the movement of the bar in the other direction causing the arm to reverse its movement and deposit the washer on a bolt at the station.

4. In a machine for assembling a lock washer to a bolt, means to feed bolts to a definite station, a hopper for supplying washers, a table, a reciprocable bar mounted to slide in said table, a movable arm pivoted to the table adjacent the bar, a rod mounted on and adapted to be moved by the bar, means connecting said rod to the arm to cause the arm to be moved by the rod, the movement of said bar in one direction causing the arm to swing on its pivot toward the hopper to take a washer therefrom, the movement of the bar in the other direction causing the arm to reverse its movement and deposit the washer on a bolt at the station, and means operable in timed relation with the movement of the arm to prevent an excess of bolts from passing to the station.

5. In a machine for assembling lock washers on bolts, means to feed bolts to a definite station, a means for taking a washer from a source of supply and placing the washer on a bolt at the station, comprising a table, a bar reciprocably mounted in the table to move to and from the station, an arm pivoted to the table adjacent the bar, means to interconnect the bar and arm to cause the arm to be moved by the bar, said arm adapted to swing to and from the source of supply to take one washer at a time and deposit said washer on the bolt at the station, the connection between said bar and arm being yieldable to cause a certain amount of lost motion to enable the bar to push the bolt and its assembled washer away from the washer receiving station, after the arm has reached the limit of its movement.

6. In a machine for assembling lock washers on bolts, means to feed bolts to a definite station, means for taking a washer from a source of supply and placing the washer on the bolt at the station, comprising a table, a bar reciprocably mounted in the table to move to and from the station, an arm pivoted to the table adjacent the bar, means to interconnect the bar and arm to cause the arm to be moved by he bar, said arm adapted to swing to and from the source of supply and having a U-shaped end with the sides of the U grooved and adapted to take one washer at a time in the groove and deposit said washer on the bolt at the station, the connection between said bar and arm being yieldable to cause a certain amount of lost motion to enable the bar to push the bolt and its assembled washer away from the washer receiving station, after the arm has reached the limit of its movement.

WILLIAM D. CHILTON.